(12) United States Patent
Papic et al.

(10) Patent No.: US 8,490,933 B2
(45) Date of Patent: Jul. 23, 2013

(54) ADJUSTABLE MOUNT WITH POSITION LOCK

(75) Inventors: Matko Papic, Alberta (CA); Samuel Han, Alberta (CA); Carlos Renderos, Alberta (CA); Shannon Lundrigan, Alberta (CA)

(73) Assignee: Evans Consoles Corporation, Calgary, Alberta (CA)

( * ) Notice: Subject to any disclaimer, the term of this patent is extended or adjusted under 35 U.S.C. 154(b) by 208 days.

(21) Appl. No.: 12/825,629

(22) Filed: Jun. 29, 2010

(65) Prior Publication Data

US 2010/0327136 A1    Dec. 30, 2010

Related U.S. Application Data

(60) Provisional application No. 61/221,264, filed on Jun. 29, 2009.

(51) Int. Cl.
*A47F 5/00*    (2006.01)

(52) U.S. Cl.
USPC ............. 248/288.11; 248/372.1; 248/123.11; 248/923

(58) Field of Classification Search
USPC ................. 248/288.11, 371, 372.1, 398, 631, 248/923, 121, 122.1, 123.11
See application file for complete search history.

(56) References Cited

U.S. PATENT DOCUMENTS

| | | | |
|---|---|---|---|
| 4,691,886 A * | 9/1987 | Wendling et al. | 248/183.1 |
| 4,729,533 A | 3/1988 | Hillary et al. | |
| 4,844,387 A * | 7/1989 | Sorgi et al. | 108/5 |
| 5,680,820 A | 10/1997 | Randolph | |
| 5,842,672 A | 12/1998 | Sweere et al. | |
| 6,394,403 B1 | 5/2002 | Hung | |
| 6,758,454 B2 | 7/2004 | Smed | |
| 7,066,435 B2 | 6/2006 | Oddsen, Jr. et al. | |
| 7,150,440 B2 | 12/2006 | Yuan | |
| 7,175,152 B2 | 2/2007 | Dittmer | |
| 7,334,762 B2 | 2/2008 | Dittmer | |
| 7,345,870 B2 | 3/2008 | Shin | |
| 7,472,458 B2 | 1/2009 | Oddsen, Jr. | |
| 7,584,933 B2 * | 9/2009 | Chih | 248/372.1 |
| 7,726,617 B2 * | 6/2010 | Zambelli et al. | 248/288.31 |
| 8,016,251 B2 * | 9/2011 | Richter | 248/125.9 |
| 2004/0262474 A1 | 12/2004 | Boks et al. | |
| 2007/0170336 A1 | 7/2007 | Li | |
| 2007/0176067 A1 | 8/2007 | Monaco | |
| 2007/0252059 A1 | 11/2007 | Katsumata et al. | |
| 2007/0252919 A1 | 11/2007 | McGreevy | |
| 2008/0203865 A1 | 8/2008 | Chouinard et al. | |
| 2009/0179128 A1 | 7/2009 | Boberg | |

* cited by examiner

*Primary Examiner* — Anita M King
(74) *Attorney, Agent, or Firm* — Notaro, Michalos & Zaccaria P.C.

(57) ABSTRACT

The present invention relates to adjustable mounts, and in particular to an adjustable mount that can be selectively locked in position by way of a position locking mechanism. The mount assembly generally comprises a base coupleable to a structure, a tilt plate coupleable to the device and pivotally connected to the base, and a position locking mechanism. The position locking mechanism generally comprises a linkage member extending between the base and the tilt plate, and a lock that is selectively adjustable between an unlocked state in which the linkage member is free to move relative the base thereby allowing the tilt plate to pivot about the base, and a locked state in which the linkage member is retained in position by the lock relative the base thereby preventing the tilt plate from pivoting about the base.

25 Claims, 8 Drawing Sheets

ADJUSTABLE MOUNT WITH POSITION LOCK

CROSS-RELATED APPLICATION

The present application claims priority under Title 35, §U.S.C. 119(e) on U.S. provisional application No. 61/221,264, filed Jun. 29, 2009, which is incorporated here by reference.

FIELD

The present invention relates to adjustable mounts, and in particular to an adjustable mount that can be selectively locked in position by way of a position locking mechanism.

BACKGROUND

Adjustable mounts are generally known in the art. In particular, adjustable mounts for flat panel displays have been around for some time. Such mounts are typically employed to fix a display on a wall, ceiling or other surface or structure. An adjustable mount allows the position, viewing angle (i.e. orientation), or both of a display to be adjusted. For example, a mount may allow the display to be tilted upwards or downwards about a horizontal axis, to be swivelled from side to side about a vertical axis, or to be adjusted in any other orientation. Furthermore, some mounts provide for the adjustment of the position of the display relative to its mounting point on a structure. For instance, the display can be moved toward or away from the mounting point by way of a movable arm.

The size and weight of flat panel displays continues to grow. Some displays exceed 96 inches (2.44 m) in diagonal screen size and some weigh in excess of 600 pounds (272 kg). Consequently, the strength, rigidity and ergonomics of adjustable mounts for use with such large and heavy displays are important considerations. A mount should be of sufficient strength to securely and safely retain the display in its proper position. A mount should also be sufficiently rigid to ensure that the display does not droop, sway or otherwise move out of position. In addition, a mount should permit the easy repositioning of the display, meaning that the force required to adjust the display should be within an ergonomically acceptable range. Furthermore, the same considerations apply not only to mounts for heavy displays, but also to mounts for any heavy loads.

Many existing adjustable mounts are either unusable or otherwise unsuitable for heavy loads. Many of these mounts are similarly unsuitable for loads on which external forces are repeated applied, such as touch-screen displays, keyboards or other input devices. The basic functionality of existing mounts is largely the same as the functionality desired in a heavy duty mount. However, many existing adjustable mounts are generally not engineered or constructed to handle heavy loads. More specifically, the strength, rigidity and ergonomics of many existing adjustable mounts are not suited for such heavy loads. Consequently, such mounts cannot support heavy loads or are otherwise not sufficiently rigid to support and retain a heavy load in a fixed position.

For instance, existing adjustable mounts often utilize one or more friction joints or friction hinges to retain a display in position. However, friction joints suffer from a number of drawbacks and are generally not suitable for use with heavy loads. Firstly, the type of material used in a friction joint significantly affects the performance and durability of the joint. Plastics are often used, as they are lightweight and inexpensive. However, plastic components tend to wear out quickly. Secondly, the performance of friction joints typically degrades over time as the contact surfaces wear out. The degradation of the contact surfaces may inconveniently necessitate frequent tightening of the joint. Furthermore, at a certain point the degree of degradation of the contact surfaces may render the friction joint unable of retaining a display in a fixed position.

The foregoing drawbacks of friction joints are exacerbated when the mount is used to mount heavy loads or loads that are subjected to additional external forces. External forces can result from a person pressing on a touch screen display or using an input device that is coupled to the mount, such as a keyboard. In such circumstances, the joint may need to be tightened beyond its operational range, thereby causing damage to the joint components. Moreover, the higher gravitational force on the load or the application of external forces can result in movement in the joint, and generally results in premature wear of the friction surfaces of the joint. In light of the foregoing, it can be appreciated that friction joints are generally not well suited for use in adjustable mounts that are to support heavy displays or will be subjected to external forces.

Many existing mounts employ one or more springs to maintain an adjusted position of the mount. Coil springs and gas springs are frequently used for this purpose. However, coil springs must be carefully chosen to achieve the desired amount of counterbalance. In addition, the springs may need to be changed if the load on the mount is significantly increased or reduced. Likewise, gas springs must be tuned to a specific load. In addition, springs are not typically capable of securely locking a mount in a fixed position. It is often desirable to be able to securely fix or lock a display in position following an adjustment. For example, this may be desirable when heavy or touch-screen displays are used. The ability to lock a screen in position is particularly important in applications where serious consequences could result if the display tilts, droops or moves out of its proper position. Such applications include but are not limited to air traffic control, vehicle operation, real time monitoring, military operations, and medical and surgical procedures such as laparoscopic surgery. Therefore there is a need for an adjustable mount that can be securely and reliably locked in position.

In addition, the hinges, joints and other pivotal connections of many existing mounts are not designed to handle heavy loads. The installation of heavy loads on such mounts can result in the premature wearing-out of the pivotal connections or in the total failure of the connections. Therefore it is desirable to have an adjustable mount having heavy duty pivotal connectors.

Another consideration for adjustable mounts for heavy displays is the ease with which the display can be adjusted, particularly when the adjustment requires overcoming gravitational force, such as when the display is raised or tilted. This is especially important when the weight of the display would render it difficult or unfeasible for a single person to lift the display without any assistance. One way of facilitating the adjustment is by employing some form of counterbalance device to at least partly offset the weight of the display. Ideally, the counterbalance device will offset most if not all of the weight of the display, thereby allowing a person to easily tilt or raise the display in an upward direction.

Furthermore, many existing mounts require that a display be fastened directly to the mount assembly. This can necessitate the display being held in position for an extended period by one or more persons while another person bolts, screws or otherwise connects the display to the mount. This is an inconvenience and can also increase the chance of the display being dropped, which poses a safety risk. It is therefore desirable to have a mount that incorporates a quick-release system that allows a display or other load to be mounted and dismounted quickly, easily and safely. It is also desirable that a quick-release system bears the entire weight of the display immediately once the display is positioned on the mount. In other words, it is desirable that the quick-release system not require that the display be held in position at the mount while one or more persons manually connects the display to the mount.

For the foregoing reasons, it can be appreciated that a need exists for a strong and rigid adjustable mount for heavy or touch-screen displays that can be locked securely in a desired position. A need also exists for an adjustable mount having a quick release capability whereby a display can be quickly and easily mounted and dismounted. There is also a need for a mount having one or more counterbalance mechanisms for at least partly offsetting the weight of the load. There is a further need for an adjustable mount having heavy duty pivotal connectors that can handle heavy displays or other loads.

SUMMARY

The present disclosure provides a slatwall and surface mount that addresses many of the shortcomings described above. In particular, the present invention is directed to an adjustable mount that can be selectively locked in position by way of a position locking mechanism.

According to the present invention then, there is provided a mount assembly for adjustably mounting a device on a structure, the mount assembly comprising a base coupleable to the structure; a tilt plate coupleable to the device, the tilt plate pivotally connected to the base; and a position locking mechanism comprising a linkage member extending between the base and the tilt plate, the linkage member connected to the tilt plate such that the linkage member moves relative the base as the tilt plate is pivoted about the base; and a lock coupled to the base and cooperating with the linkage member, the lock selectively adjustable between an unlocked state in which the linkage member is free to move relative the base thereby allowing the tilt plate to pivot about the base, and a locked state in which the linkage member is retained in position by the lock relative the base thereby preventing the tilt plate from pivoting about the base.

BRIEF DESCRIPTION OF THE DRAWINGS

Preferred embodiments of the present invention will now be described in greater detail and will be better understood when read in conjunction with the drawings in which.

DETAILED DESCRIPTION

While the disclosed embodiments are described in the form of a mount for a flat panel display, the scope of the present disclosure is not intended to be limited to mounts for flat panel displays. The present adjustable mount can be used to mount more than one display, or a combination of one or more displays along with other equipment, such as a keyboard or keyboard tray. The adjustable mount can also be used for other applications to mount one or more other objects.

The various features and components of the present adjustable mount are now described with reference to the Figures.

Figure 1:
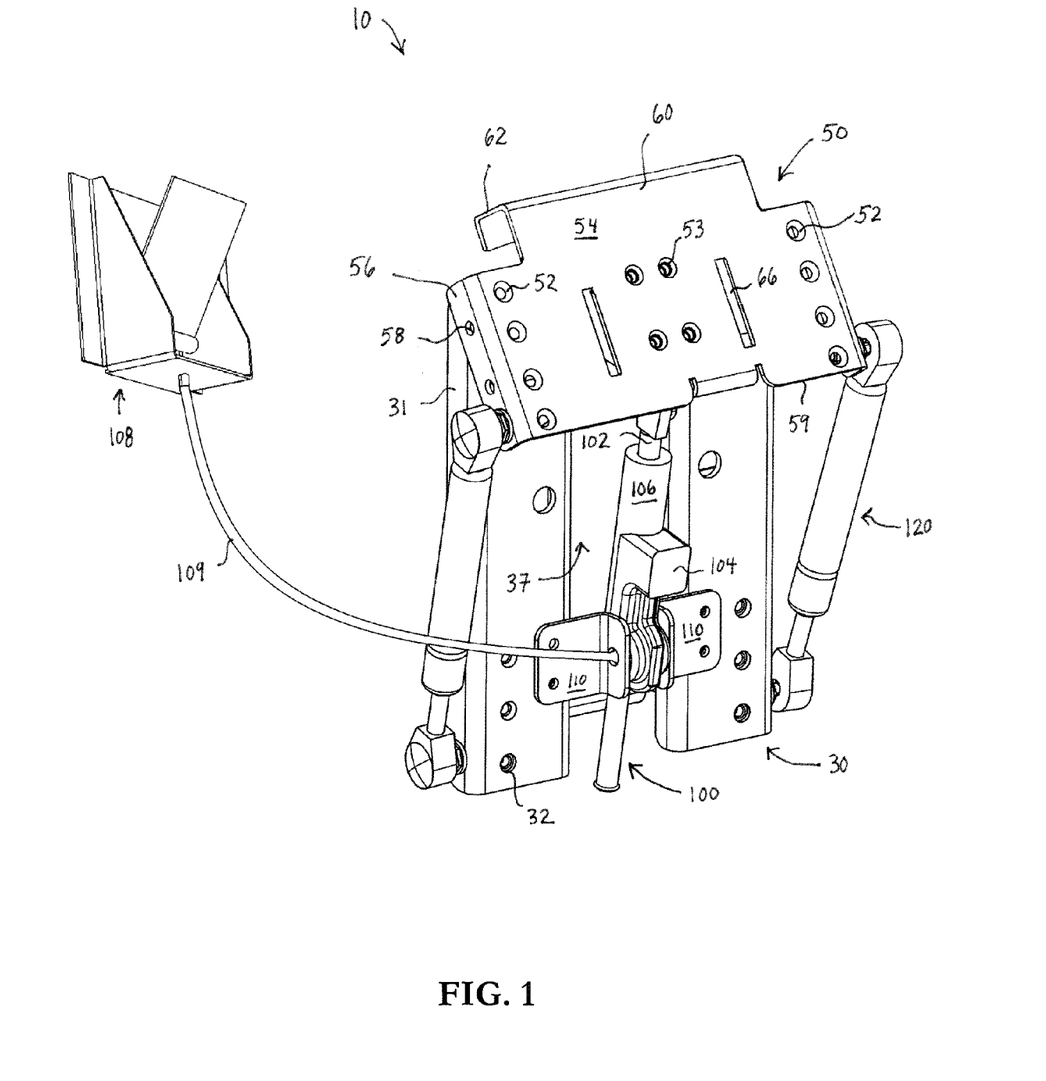
FIG. 1 is a perspective front view of one embodiment of the adjustable mount.
Figure 4:
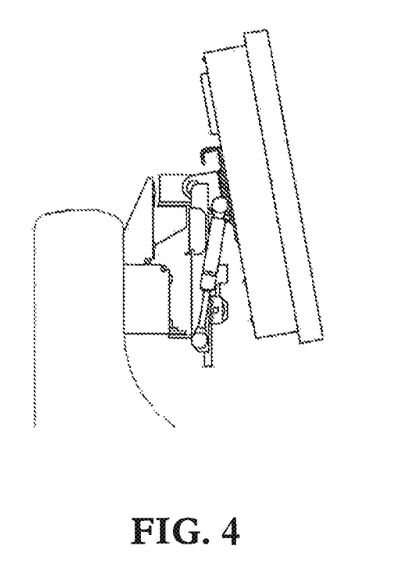
FIG. 4 is a side view of one embodiment of the adjustable mount coupled to a support structure and supporting a display.

FIG. 1 shows one embodiment of the adjustable mount 10, which generally comprises a base 30, a tilt plate 50, and a position locking mechanism 100. For illustrative purposes, FIG. 4 shows mount 10 fixed to a structure and supporting a display.

Figure 2:
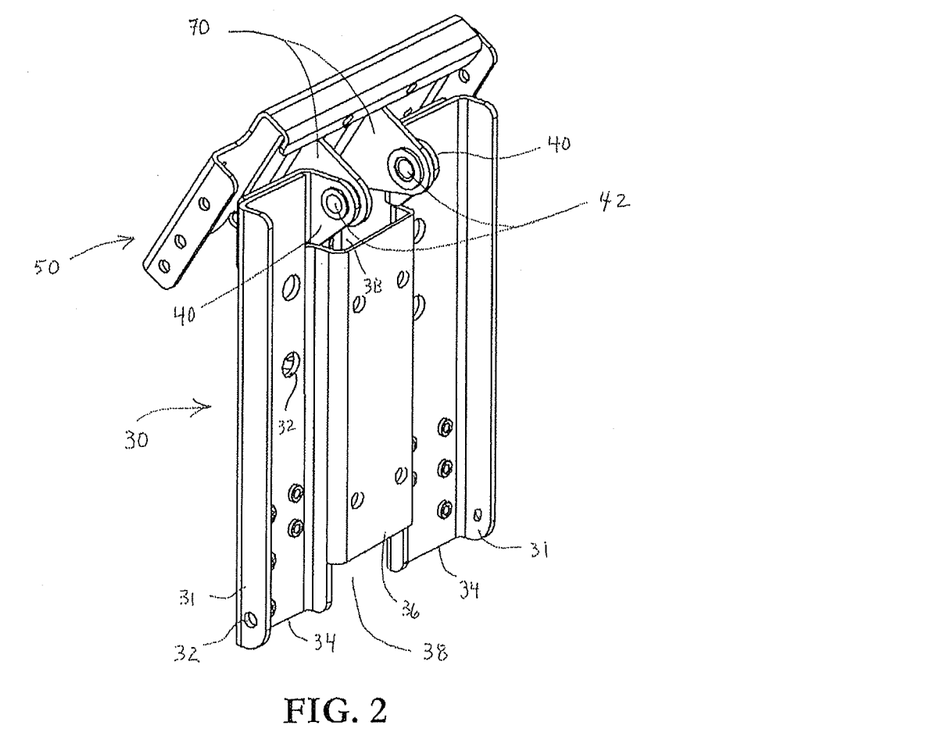
FIG. 2 is a perspective rear view of the embodiment of FIG. 1 without the gas springs or locking cylinder.

Base 30 will typically be coupled to a wall or other structure on which the display is to be mounted. Base 30 can comprise one or more fixing apertures 32 for receiving fasteners or other attachment means to couple base 30 to a structure. Apertures 32 can also be used to attach hardware or other objects to base 30. As best shown in FIG. 2, in at least one embodiment base 30 comprises a pair of outer portions 34, which are joined by an inner portion 36. Each of portions 34 and 36 can have lateral sides that extend at approximately 90 degrees from the central region of the portion. Inner portion 36 is orientated in an opposite direction relative to outer portions 34 so as to define a central recess 37 in the front side of base 30, which is shown in FIG. 1. Again with reference to FIG. 2, inner portion 36 can be slightly shorter than outer portions 34, thereby forming gaps 38 between outer portions 34 at the upper and lower ends of inner portion 36.

Figure 2A:
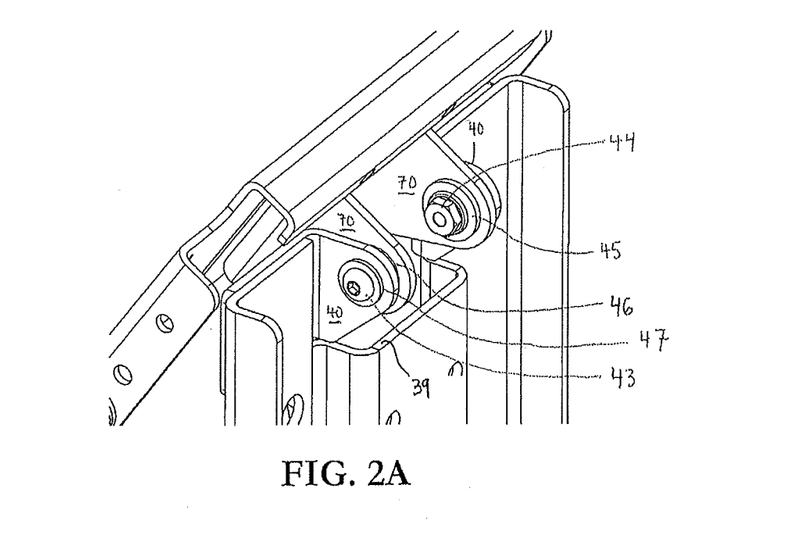
FIG. 2A is a closeup view of the pivotal connection of the tilt plate to the base of another embodiment of the adjustable mount.

As mentioned above, tilt plate 50 is pivotally connected to base 30. The pivotal connection can be achieved using one or more hinges. The one or more hinges can be in the form of a knuckle hinge, a bolted hinge, or any other suitable type of hinge. For example, a knuckle hinge can be used in a mount designed for lighter load applications, whereas a stronger, bolted hinge design can be employed in a mount designed for heavier loads. One type of knuckle is sold by Innovative Office Products, Inc. (part number 8336-104). As shown in FIGS. 2 and 2A, in at least one embodiment, two base hinge flanges 40 are formed at upper gap 38. Tilt plate 50 comprises corresponding tilt plate hinge flanges 70, which protrude from the rear side of tilt plate 50.

Each tilt plate hinge flange 70 is pivotally coupled to a corresponding base hinge flange 40 on base 30 by way of a pivot 42. Pivot 42 may be in the form of a pin, bolt, rod or any other suitable pivot member. With reference to FIG. 2A, in at least one embodiment, each pivot 42 can be in the form of a bolt 43, which is retained in position by a nut 44. Each pivotal connection can further comprise one or more washers 47, a polymer flanged bearing 45, and a thrust washer 46 to provide a strong and long lasting pivotal connection. In particular, thrust washer 46 can be self-lubricating and can be disposed between adjacent hinge flange 40 and tilt plate hinge flange 70 to provide a lubricated bearing surface. In addition, each pivotal connection can have a flanged bearing 45 to isolate bolt 43 and nut 44 from the movement of tilt plate hinge flange 70 relative to base hinge flange 40. Each flanged bearing 45 can be positioned at tilt plate hinge flange 70 to allow tilt plate hinge flange 70 and therefore tilt plate 50 to rotate freely about bolt 43 when nut 44 is tightened on bolt 43. Once of flanged bearings 45 is shown in FIG. 2A. In addition to providing for smoother rotation and increasing the useful life of the pivotal connection, the use of flanged bearings 45 will also prevent the loosening and backing-out of the nut 44 and bolt 43 over time. Furthermore, at least one of hinge flanges 70 of tilt plate 50 can be shaped or otherwise adapted to restrict the tilting range of tilt plate 50. In the embodiment shown in FIG. 10, hinge flanges 70 are shaped to prevent tilt plate 50 from being tilted upwardly beyond a certain point. More specifically, the protruding end portions 72 of hinge flanges 70 will contact a surface, such as an upper edge 39 of inner portion 36 of base 30, that prevents any further rotation of tilt plate 50. In addition, it will be appreciated that one or more of hinge flanges 70 can be adapted to restrict the downward rotation of tilt plate 50.

In at least one embodiment, a display can be connected directly to tilt plate 50. As shown in FIG. 1, tilt plate 50 can be substantially planar in shape and can have one or more fixing apertures 52 and 53, which may be used for coupling the display to plate 50. Plate 50 can comprise a mating portion 62, the purpose of which will be described below. The sides 56 of plate 50 can extend at an angle from the main portion 54 of plate 50 to strengthen the plate and to define secondary mounting surfaces. In the embodiments shown in the Figures, sides 56 extend from main portion 54 at approximately 90 degrees. Sides 56 may also define one or more fixing apertures 58.

Base 30 and tilt plate 50 are made of one or more suitable materials of sufficient strength and rigidity. Base 30 and plate 50 will typically be made of metal, but may also be made of any other suitable material known in the art. As an example, it has been determined that base 30 and plate 50 formed of steel sheet metal having a gauge of at least 14 (1.9 mm) should provide sufficient strength and rigidity to support loads of at least 300 pounds (131 kg). However, it will be appreciated by those skilled in the art that the strength and rigidity of mount 10 can be increased, for example by increasing the thickness of base 30 and plate 50.

As shown in FIG. 1, adjustable mount 10 also comprises a position locking mechanism 100 disposed on the front side of base 30 for selectively retaining tilt plate 50 in position relative to base 30. In other words, locking mechanism 100 can be made to prevent tilt plate 50 from pivoting relative base 30. Locking mechanism 100 generally comprises a linkage member 102 and a lock 104. Linkage member 102 extends between base 30 and tilt plate 50. Linkage member 102 is moveable relative base 30 and can be locked in position relative base 30 by lock 104. In at least one embodiment, one end of linkage member 102 is pivotally connected to tilt plate 50 such that linkage member 102 moves relative base 30 as tilt plate 50 is pivoted about base 30. In addition, in at least one embodiment, linkage member 102 can be locked at any position within its operational range, meaning that locking mechanism 100 is not restricted to one or more discrete locking positions. As shown in FIG. 1, linkage member 102 can be in the form of a rod, but can take any other suitable form, including a bolt, arm, or bar.

Lock 104 cooperates with linkage member 102 and is generally coupled to or disposed proximate base 30. Lock 104 is selectively adjustable between an unlocked state in which linkage member 102 is free to move relative base 30 thereby allowing tilt plate 50 to pivot about base 30, and a locked state in which linkage member 102 is retained in position by lock 104 relative base 30 thereby preventing tilt plate 50 from pivoting about base 30.

Figure 10:
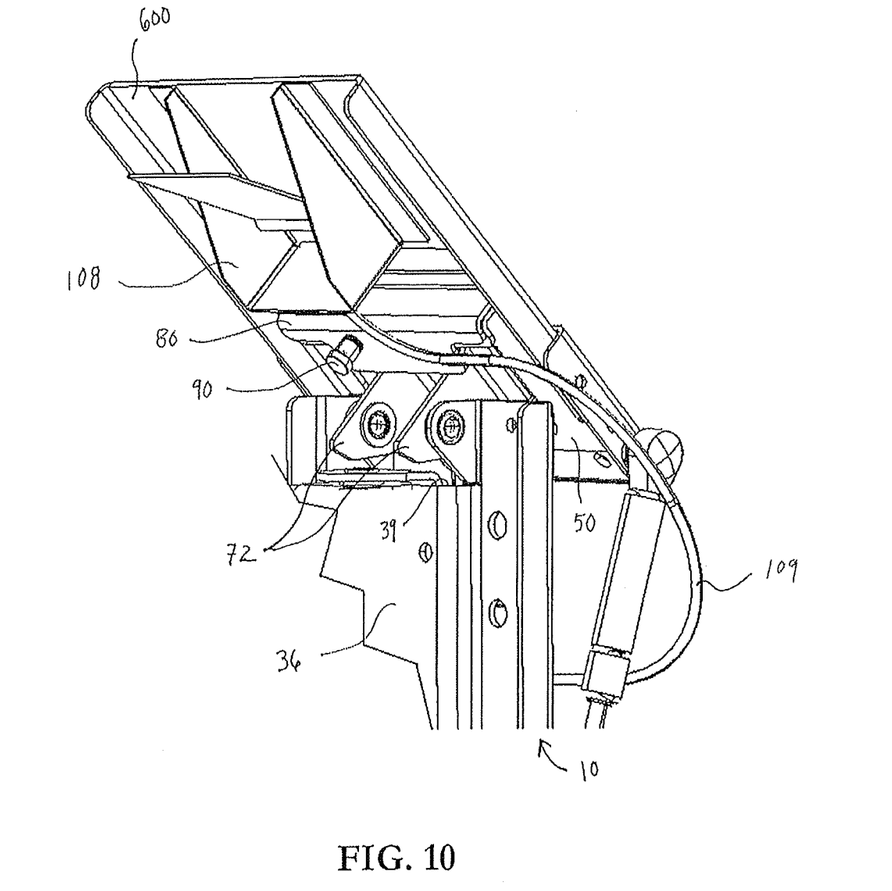
FIG. 10 is a rear partial view of another embodiment of the mount of the present invention.

In at least one embodiment, lock 104 is in the form of a mechanical locking cylinder 106. Mechanical locking cylinders are generally known in the art. Locking cylinder 106 allows linkage member 102 to move within locking cylinder 106 when in the unlocked state, and prevents linkage member 102 from moving within locking cylinder 106 when in the locked state. Having regard to FIG. 1, the particular locking cylinder shown is made by Weber Knapp (model no. 22946). In addition to locking cylinder 106, this device further comprises a paddle assembly 108, which is connected to cylinder 106 by way of a cable 109. In use, locking cylinder 106 is typically biased in a locked state. When the paddle of paddle assembly 108 is depressed, locking cylinder 106 is shifted into an unlocked state, thereby permitting movement of linkage member 102 within the cylinder. When the paddle is released, locking cylinder 106 returns to the locked state. Paddle assembly 108 can be affixed at any suitable location, including on an object mounted on adjustable mount 10 or on any other nearby structure. For example, FIG. 10 shows one possible arrangement in which paddle assembly 108 is connected to a larger plate 600 that has been mounted to tilt plate 50.

As will be appreciated by those skilled in the art, the position locking mechanism shown in the Figures and described herein is meant as an example only and is not meant to limit the scope of the present disclosure. Other means for selectively locking tilt plate 50 in position relative to base 30 will be apparent to those skilled in the art.

As best shown in FIG. 1, locking cylinder 106 is disposed proximate recess 37 defined by base 30. Locking cylinder 106 is coupled to base 30 by way of two brackets 110. Each bracket 110 is fixedly connected to base 30 and pivotally connected to locking cylinder 106. The pivotal connection permits for rotation of locking cylinder 106 as the angle of tilt plate 50 is adjusted. Recess 37 provides some operational room for cylinder 106 and linkage member 102

Adjustable mount 10 can also comprise at least one counterbalance mechanism 120 for counterbalancing at least part of the weight of a display. A counterbalance mechanism facilitates the upward tilting of a display and is particularly useful when the display is very heavy. The counterbalance mechanism 120 can be in the form of a gas spring. A gas spring may be suitable as gas springs generally maintain a consistent force throughout their stroke. However, other types of counterbalance mechanisms known in the art can be utilized either alone or in combination. For example, counter weights or mechanical springs, such as coil springs, can be used.

In at least one embodiment, counterbalance mechanism 120 extends between and is connected to tilt plate 50 and base 30. More specifically, one end of counterbalance 120 is connected to a side 56 of plate 50, whereas the opposite end is connected to a corresponding side 31 of base 30. The connections can be made using simple fasteners or any other suitable connectors known in the art. As shown in FIG. 1, in at least one embodiment mount 10 has two counterbalance mechanisms 120 disposed on opposite sides of mount 10.

The positioning of counterbalance mechanism 120 on a side of the mount makes counterbalance 120 easily accessible and therefore easily changeable. This is particularly useful when the display on mount 10 is changed, such as when one display is changed for a lighter or heavier display, or when additional displays are added to the mount. If the difference in the loads is significant, it may be desirable or necessary to exchange the one or more counterbalance mechanisms 120 for other counterbalance mechanisms that match the weight of the new display. For instance, a gas spring or coil spring could be replaced with a different spring having a lower or greater spring force. As shown in FIG. 1, a counterbalance mechanism can be connected to a side 56 of tilt plate 50 and to a corresponding side of base 30.

Figure 3:
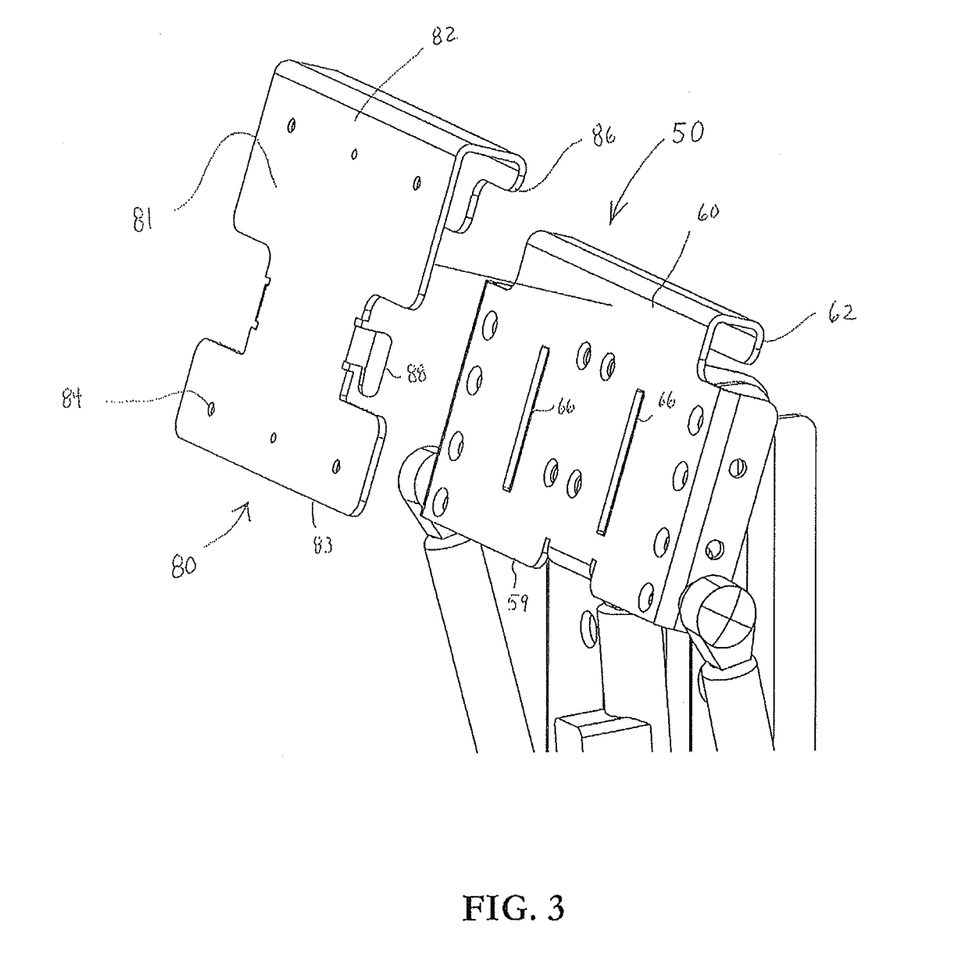
FIG. 3 is a perspective view of the tilt plate of the embodiment of FIG. 1 and of a device plate.

As shown in FIG. 3, mount 10 may further comprise a quick-release system for providing a quick-release and toolless connection of a display to mount 10. The quick-release system generally comprises tilt plate 50 and a device plate 80 that is slidably and releasably connectable to tilt plate 50. Device plate 80 generally comprises a hanger 86 to support and retain device plate 80 on tilt plate 50, effectively allowing device plate 80 to "hang" on tilt plate 50, and at least one hook 88 for retaining device plate 80 in position relative tilt plate 50 when device plate 80 is positioned onto tilt plate 50. The quick-release system is now described with reference to adjustable mount 10. However, it is to be appreciated that the quick-release system may be used to connect one or more objects to any structure, and need not necessarily be used as part of or otherwise incorporated into adjustable mount 10.

Rather than fastening a display directly to tilt plate 50, the display is fastened to device plate 80, which is in turn slidably and releasably connectable to tilt plate 50. Device plate 80 can be fastened to the back side of a display before the display is mounted onto the mount. The display can then be positioned on and secured to tilt plate 50 quickly and efficiently, and without the use of any tools. More specifically, device plate 80 is complementary to and receivable onto tilt plate 50. The releasable connection is established by sliding device plate 80 onto tilt plate 50. The releasable connection will be sufficient to firmly and securely retain device plate 80, along with the display that it bears, in position relative tilt plate 50.

One embodiment of the adjustable mount having a device plate is now described, with reference to FIG. 3. Device plate 80 comprises a front side 81 and a back side. Device plate 80 generally defines one or more fixing apertures 84, which may be used for fastening a display to front side 81 of plate 80. Furthermore, device plate 80 also comprises a hanger 86 capable of engaging mating portion 62 of tilt plate 50 when device plate 80 is slid onto tilt plate 50. As mentioned above, hanger 86 retains device plate 80 on tilt plate 50. Hanger 86 also generally transfers weight of the display to tilt plate 50. Furthermore, in at least one embodiment, hanger 86 will preferably fit closely over mating portion 62 so as to provide a snug fit between the two components. In this way, hanger 86 will retain device plate 80 against or proximate to tilt plate 50. Although both mating portion 62 and hanger 86 are shown as having a substantially L-shaped cross section, it is to be appreciated that they can have other shapes so long as hanger 86 fits closely over mating portion 62. As described above, once device plate 80 is positioned on tilt plate 50, it is generally hanger 86 that transfers a proportion, typically a significant or entire proportion, of the weight of the display to tilt plate 50. Therefore when the display is installed onto mount 10, the one or more persons lifting or holding the display can release the display immediately after device plate 80 is slid onto tilt plate 50. This is unlike many existing mounts, which require one or more persons to hold the display in position at the mount while one or more other persons secure the display to the mount using bolts, screws or other connection means.

Device plate 80 further comprises a pair of hooks 88, which protrude outwardly from the back side of device plate 80 and are spaced away from hanger 86. Hooks 88 serve to further retain device plate 80 in position on tilt plate 50 once device plate 80 has been slid onto tilt plate 50. Hooks 88 retain the device plate 80 by engaging hook engagement portions in or on tilt plate 50. Hooks 88 generally serve more to retain device plate 80 in proper position relative to tilt plate 50 than to bear and transfer weight of a display to tilt plate 50. For example, in the embodiment shown in FIG. 3, hooks 88 cooperate with slots 66 to prevent any side-to-side movement of device plate 80 relative tilt plate 50, and also to retain bottom edge 83 of device plate 80 proximate bottom edge 59 of tilt plate 50. In contrast, the weight of a display is generally transferred to tilt plate 50 by hanger 86, although the actual proportion of the weight transferred depends on the tilt angle of tilt plate 50.

In at least one embodiment, as shown in FIG. 3, the hook engagement portions are in the form of narrow slots 66 defined in tilt plate 50. Hooks 88 are receivable into and cooperable with slots 66. Each slot 66 can be a narrow aperture in tilt plate 50 extending in a direction that is substantially parallel to the axis along which device plate 80 is slid onto and off of tilt plate 50. Slots 66 are best shown in FIG. 1. Once again having reference to FIG. 3, hooks 88 are located on device plate 80 correspondingly with slots 66 so that each hook 88 is receivable into a one of slots 66. Each hook 88 extends towards the bottom edge 83 of device plate 80 and is located on device plate 80 such that when plate 80 is positioned on tilt plate 50, each hook 88 extends into one of slots 66 and engages a side or edge of the slot. When device plate 80 is connected to tilt plate 50, hooks 88 prevent any side-to-side movement of plate 80 relative to tilt plate 50. Furthermore, hooks 88 also retain bottom edge 83 of device plate 80 against or proximate tilt plate 50.

Device plate 80 may be secured to tilt plate 50 to prevent an inadvertent disengagement of device plate 80 from the mount. Having reference to FIGS. 10 and 11, in at least one embodiment hanger 86 of device plate 80 can comprise a first hole (not shown) that aligns with a second hole (not shown) in mating portion 62 of tilt plate 50 when the device plate is installed on the tilt plate. Securing hardware 90, such as a fastener, pin or other obstruction member can be inserted through the first hole into the second hole to lock or retain device plate 80 on tilt plate 50. In at least one embodiment, the first and/or second holes can be threaded to receive a threaded fastener, such as a bolt or screw. In an alternative, securing hardware 90 can be in the form of a spring loaded plunger. One type of spring loaded plunger generally has a housing, a plunger that is slidably engaged with the housing, and a biasing member to bias the plunger relative the housing. The plunger is typically lockable in at least one position. An example of this type of spring loaded plunger is a "spring loaded plunger assembly" made by Penn Engineering™. It will be further appreciated that the securing hardware can be of the tool-less type, such as for example thumb screws, or can be of the type that requires the use of a tool.

The installation of device plate 80 onto tilt plate 50 involves positioning device plate 80 slightly above tilt plate 50 such that hanger 86 is slightly above mating portion 62 of tilt plate 50. This positioning is shown in FIG. 3. The planar portion of device plate 80 is then moved towards the planar portion of tilt plate 50 such that hooks 88 are in alignment with slots 66. Once the planar portions of both plates 80 and 50 are in contact with one another or are in sufficient proximity and hooks 88 are positioned within slots 66, device plate 80 is slid towards the bottom edge 59 of tilt plate 50 until hanger 86 fully engages mating portion 62 of tilt plate 50 each hook 88 engages the side or edge of one of slots 66.

Figure 8:
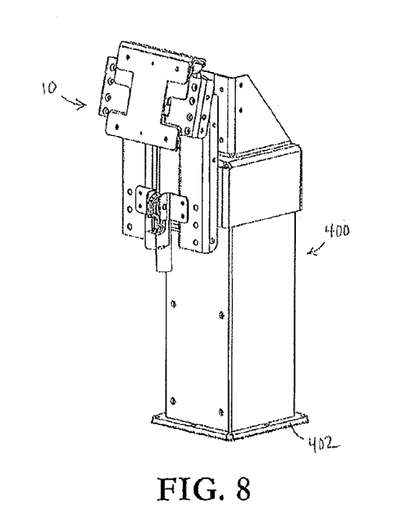
FIG. 8 is a perspective view of another embodiment of the adjustable mount coupled to a static column.
Figure 9:
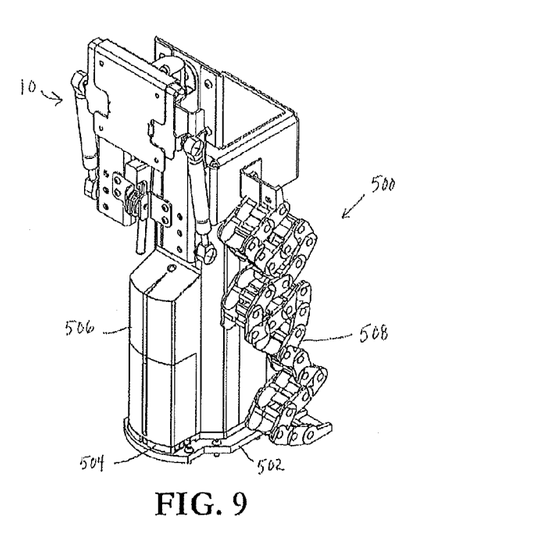
FIG. 9 is a perspective view of another embodiment of the adjustable mount coupled to a power actuated lift column.

FIGS. 8 and 9 show different embodiments of the adjustable mount with a device plate connected to tilt plate 50. As with base 30 and tilt plate 50, device plate 80 will generally also be made of metal, but can also be made of any other suitable material known in the art.

Figure 6:
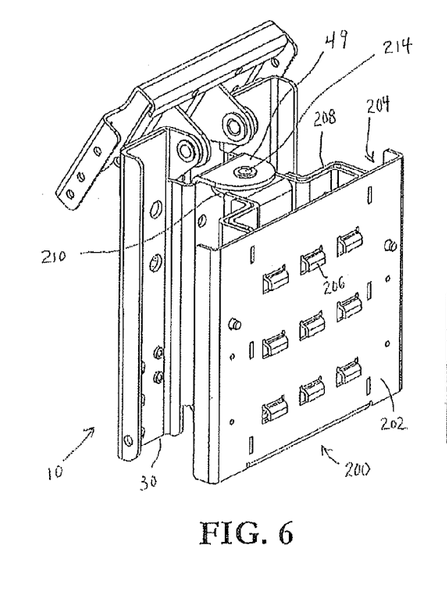
FIG. 6 is a perspective view of another embodiment of the adjustable mount coupled to a slat wall mount.

As mentioned above, base 30 will typically be coupled to a wall or other structure on which a display is to be mounted. FIGS. 6 to 9 show different embodiments of adjustable mount 10 coupled to various structures. FIG. 6 shows mount 10 coupled to a slat wall mount 200. The rear side 202 of slat wall mount 200 comprises one or more hook-like protrusions 206 for engaging what is known in the art as a slat wall (not shown). Front side 204 of mount 200 comprises a bracket 208 having an upper flange 210 and a lower flange (not shown). Upper and lower flanges extend away from bracket 208 for engagement with a pair of corresponding flanges 49 that extend from base 30 of adjustable mount 10. Upper and lower flanges of slat wall mount 200 are pivotally connected to corresponding flanges 49 of mount 10 by way of pivots 214, thereby allowing adjustable mount 10 to be swivelled about slat wall mount 200. The swivelled connection provides an additional degree of adjustment for a display.

Figure 7:
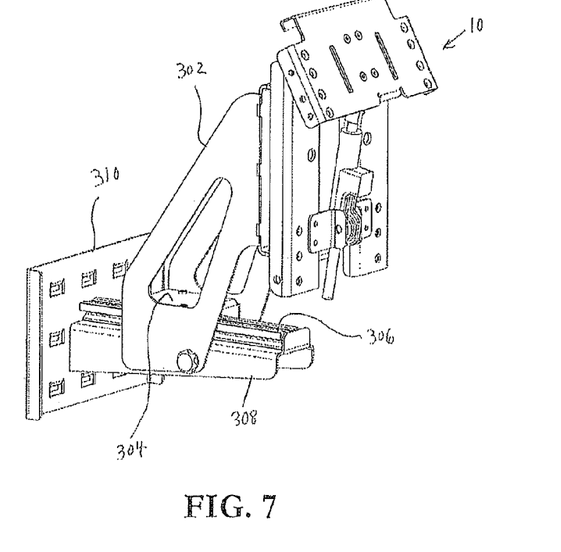
FIG. 7 is a perspective view of another embodiment of the adjustable mount coupled to a linear rail system.

In another configuration, adjustable mount 10 may be coupled to a linear rail system 300 for front to back movement along a rail as shown in FIG. 7. Linear rail system 300 comprises a mount support 302, a carriage assembly 304, a rail 306, and a rail support 308. Adjustable mount 10 is coupled to mount support 302, which is in turn connected to carriage assembly 304. Carriage assembly 304 is slidably connected to rail 306. In particular, carriage assembly 304 also surrounds the top, the sides and the undersides of rail 306. In this way, assembly 304 may only be moved relative rail 306 along the longitudinal axis of rail 306, thereby providing for a very stable and rigid platform. Furthermore, the aforementioned structure and characteristics of assembly 304 enable rail system 300 to withstand and operate under significant moment loading, including both front-to-back and side-to-side moment loading. Assembly 304 also enables system 300 to withstand and operate under large off-center loading. This is important when adjustable mount 10 bears a heavy display. Rail system 300 allows the display to be moved frontward and backwards along rail 306 without binding. The particular carriage assembly 304 and rail 306 shown in FIG. 7 are sold by Igus™, which is headquartered in Cologne, Germany. Carriage assembly 304 is called a "pillow block" and has part number WJUM-01-10, whereas rail 306 has part number WS-10.

FIG. 7 shows rail support 308 connected to a slat wall mounting plate 310. It will be appreciated however that rail support 308 may be connected to any suitable structure.

In yet another configuration, as shown in FIG. 8, adjustable mount 10 may be connected to a static column 400. Column 400 can be fastened at its base 402 to a desktop, console or other structure. Alternatively, column 400 can be fastened to a structure such as a wall or slat wall by way of brackets or other mounting hardware. Adjustable mount 10 may be rigidly connected to column 400. Alternatively, mount 10 can be movably coupled to column 400 to provide additional degrees of adjustability for mount 10. For instance, mount 10 can be pivotally connected to column 400 to allow it to be swivelled from side-to-side in the same manner as the mount shown in FIG. 6 can be swivelled relative to slat wall mount 200.

In a further configuration, as shown in FIG. 9, mount 10 may be connected to a power actuated lift column 500. Lift column 500 allows the height of the mount, and thus a display, to be adjusted to a desired height. Column 500 comprises a base 502, at least two telescoping column members 504 and 506, and a powered actuator (not shown) disposed within the column members 504 and 506. In one embodiment, lift column 500 has approximately 450 mm of vertical adjustment. However, lift column 500 can be adapted to provide a shorter or longer vertical adjustment. The particular column shown in FIG. 9 is sold by SKF Magnetic and is of the TFG family of telescoping columns. In addition, column 500 may also comprise a cable management device 508 to ensure that the integrity of any cables running up to a display is maintained throughout the full travel of lift column 500. Cable management device 508 can be in the form of a chain-like assembly such as the one shown in FIG. 9, which is sold by Igus™ and is part of the Energy Chain family of products. Furthermore, the manner of coupling of mount 10 to column 500, and the manner of fastening column 500 to a desk or other structure can be the same as those described above in relation to static column 400.

Figure 5:
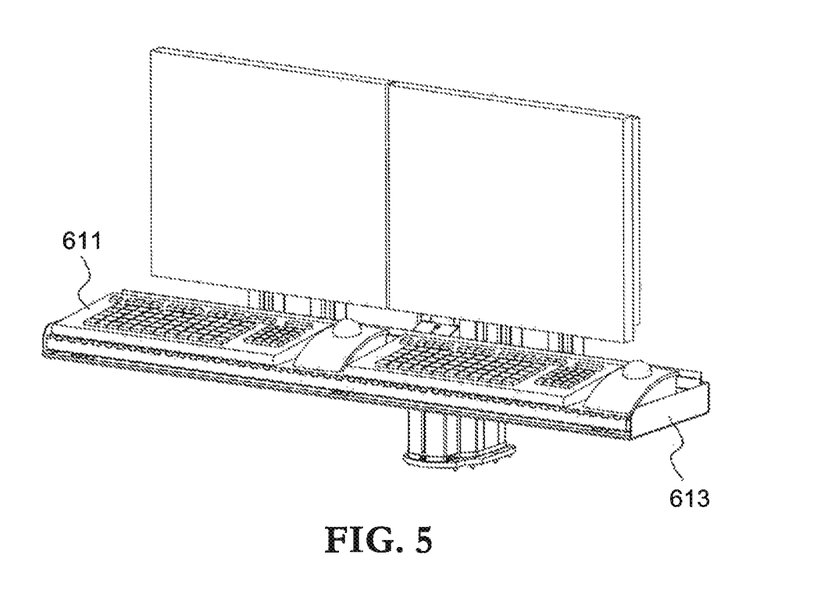
FIG. 5 is a view of a configuration of two displays and a keyboard support tray, all of which can be mounted to a structure by way of the adjustable mount.
Figure 11:
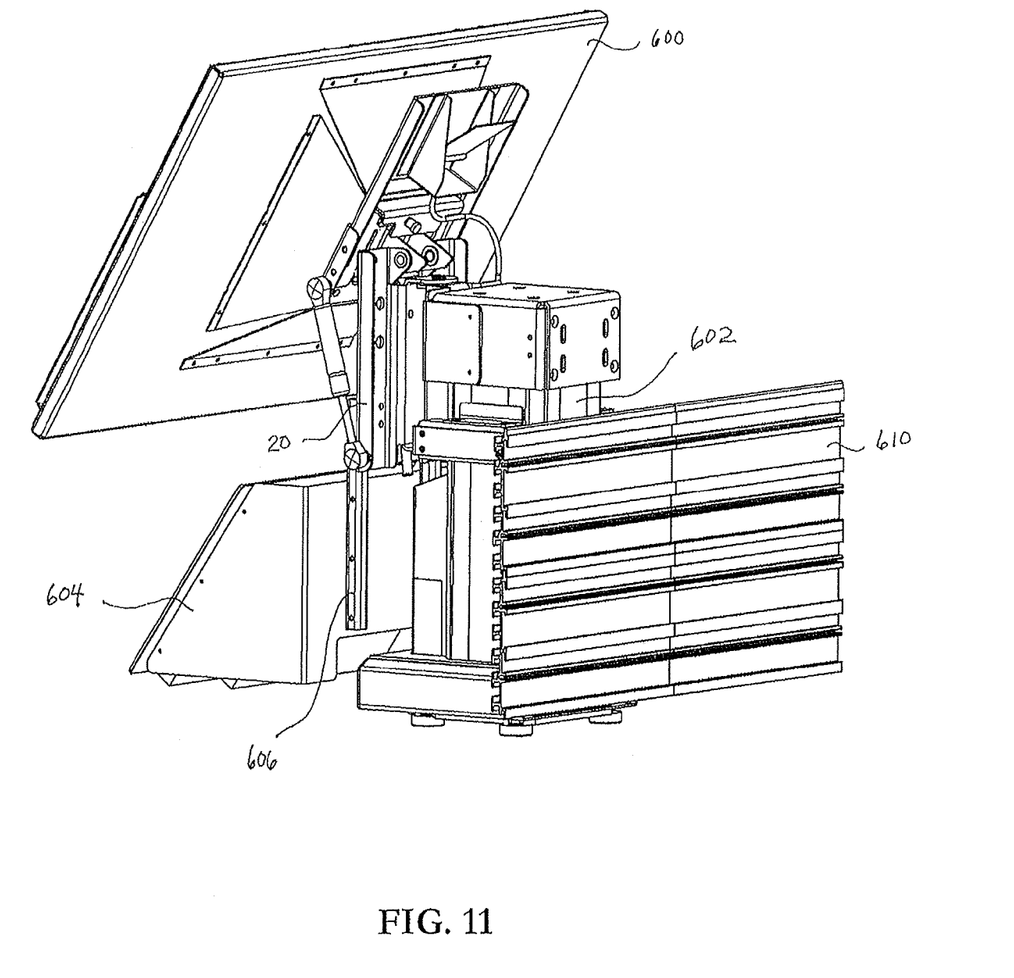
FIG. 11 is a rear perspective view of the embodiment shown in FIG. 10 positioned on a column and supporting a flight strip tray and a display.
Figure 12:
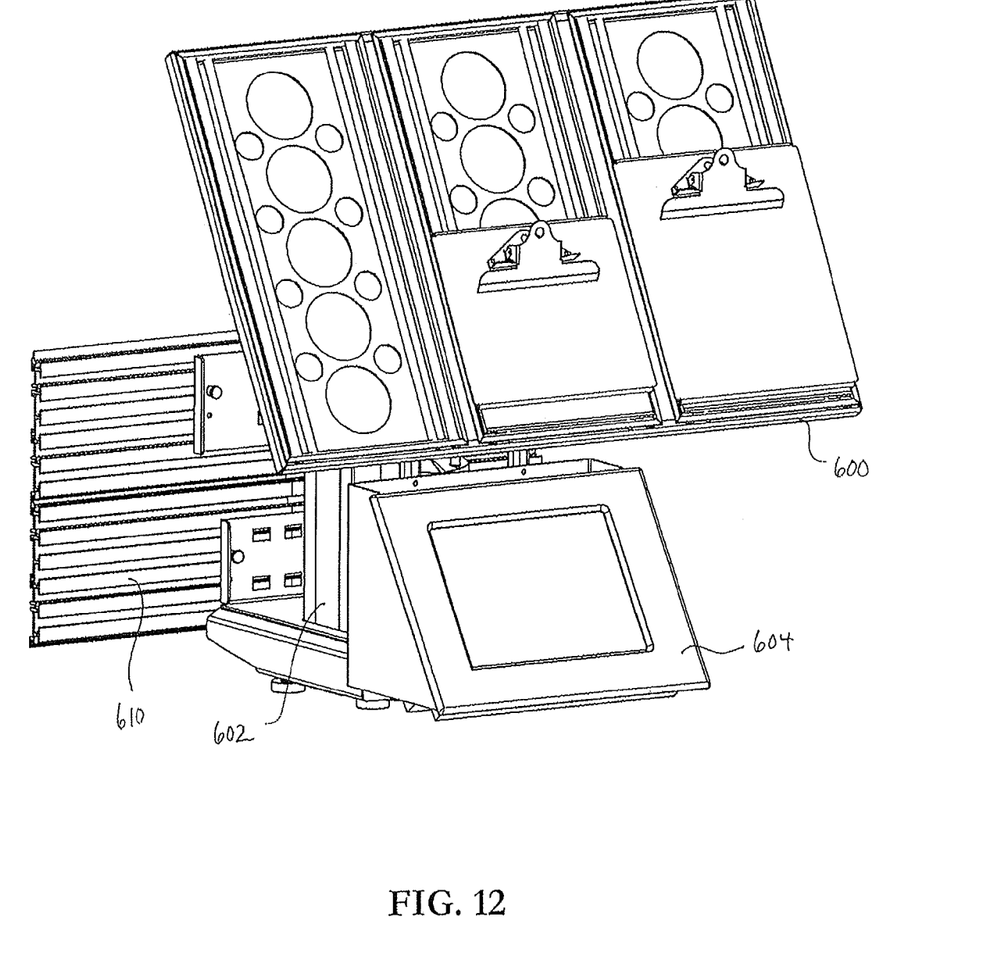
FIG. 12 is a front perspective view of the arrangement shown in FIG. 11.

Again, while the disclosed embodiments have been described in the form of a mount for a flat panel display, the scope of the present disclosure is not intended to be limited to mounts for flat panel displays. The present adjustable mount can be used to mount more than one display 604, as shown in FIG. 5, or a combination of one or more displays along with other equipment, such as a keyboard 611 or keyboard tray 613. The adjustable mount can also be used for other applications to mount one or more various objects such as a flight strip tray for use in air traffic control applications. FIGS. 11 and 12 show one embodiment of mount 10 supporting a flight strip tray 600 on tilt plate 50. In addition, a display 604 is supported below flight strip tray 600 and is connected to base 20 of mount 10 by way of one or more brackets 606. The mount itself is positioned on a support column 602, which is connected to a slatwall 610. Again, it is to be appreciated that FIGS. 11 and 12 are meant only as an example and are not intended to limit the scope of the present invention.

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A mount assembly for adjustably mounting a device on a structure, the mount assembly comprising:
 a base coupleable to the structure;
 a tilt plate coupleable to the device, the tilt plate pivotally connected to the base; and a position locking mechanism comprising:
  a linkage member extending between the base and the tilt plate, the linkage member connected to the tilt plate such that the linkage member moves relative the base as the tilt plate is pivoted about the base; and
  a locking cylinder coupled to the base and cooperating with the linkage member, the locking cylinder defining a hollow for receiving at least a portion of the linkage member, the locking cylinder being selectively adjustable between an unlocked state in which the linkage member is free to move within the locking cylinder thereby allowing the tilt plate to pivot about the base, and a locked state in which the linkage member is locked in position within the locking cylinder thereby preventing the tilt plate from pivoting about the base.

2. The mount assembly according to claim 1 wherein the linkage member can be selectively locked in position anywhere within an operation range of the linkage member.

3. The mount assembly according to claim 1 further comprising a counterbalance mechanism for counterbalancing at least part of the weight of the device when the device is coupled to the tilt plate.

4. The mount assembly according to claim 3 wherein counterbalance mechanism extends between and is connected to the base and the tilt plate.

5. The mount assembly according to claim 1 further comprising a device plate fastenable to the device, the device plate being receivable onto the tilt plate and releasably connectable to the tilt plate.

6. The mount assembly according to claim 1 wherein the tilt plate comprises a mating portion and a hook engagement portion, and the mount assembly further comprises:
  a device plate being slidably connectable with the tilt plate by sliding the device plate onto the tilt plate, the device plate comprising a front side and a back side, the device being fastenable to the front side, the device plate further comprising a hanger, and a hook protruding from the back side and being spaced away from the hanger, wherein when the device plate is slid onto the tilt plate, the hanger engages the mating portion of the tilt plate to retain the device plate in position on the tilt plate and to transfer weight of the device to the tilt plate, and the hook engages the hook engagement portion on the tilt plate to further retain the device plate in position on the tilt plate.

7. A mount assembly for adjustably mounting a device on a structure, the mount assembly comprising:
  a base coupleable to the structure;
  a tilt plate coupleable to the device, the tilt plate pivotally connected to the base; and
  a position locking mechanism comprising:
  a linkage member extending between the base and the tilt plate, the linkage member connected to the tilt plate such that the linkage member moves relative the base as the tilt plate is pivoted about the base; and
  a locking cylinder pivotally connected to the base and cooperating with the linkage member, the locking cylinder defining a hollow for receiving at least a portion of the linkage member, the locking cylinder being selectively adjustable between an unlocked state in which the linkage member is free to move within the locking cylinder thereby allowing the tilt plate to pivot about the base, and a locked state in which the linkage member is prevented from moving within the locking cylinder thereby preventing the tilt plate from pivoting about the base.

8. The mount assembly according to claim 7 further comprising a counterbalance mechanism for counterbalancing at least part of the weight of the device when the device is coupled to the tilt plate.

9. The mount assembly according to claim 8 wherein counterbalance mechanism extends between and is connected to the base and the tilt plate.

10. The mount assembly according to claim 9 wherein the tilt plate comprises a main portion and at least one side portion, the at least one side portion extending from the main portion at an angle and on the side of the tilt plate that faces the base, and wherein counterbalance mechanism is connected to the tilt plate at the at least one side portion.

11. The mount assembly according to claim 10 wherein the counterbalance mechanism is a spring.

12. The mount assembly according to claim 11 wherein the spring is a gas spring.

13. The mount assembly according to claim 7 further comprising a device plate fastenable to the device, the device plate being receivable onto the tilt plate and releasably connectable to the tilt plate.

14. The mount assembly according to claim 7 wherein the tilt plate comprises a mating portion and a hook engagement portion, and the mount assembly further comprises:
  a device plate being slidably connectable with the tilt plate by sliding the device plate onto the tilt plate, the device plate comprising a front side and a back side, the device being fastenable to the front side, the device plate further comprising a hanger, and a hook protruding from the back side and being spaced away from the hanger, wherein when the device plate is slid onto the tilt plate, the hanger engages the mating portion of the tilt plate to retain the device plate in position on the tilt plate and to transfer weight of the device to the tilt plate, and the hook engages the hook engagement portion on the tilt plate to further retain the device plate in position on the tilt plate.

15. The system of claim 14 wherein the hook engagement portion is in the form of a slot defined in the tilt plate, the slot extending in a direction that is substantially parallel to the axis along which the device plate is slid onto and off of the tilt plate, and wherein the hook of the device plate is positioned correspondingly with the slot in the tilt plate so that the hook is receivable into the slot, and wherein when the device plate is fully slid onto the tilt plate, the hook retains the device plate in position on the tilt plate by engaging the slot.

16. The system of claim 14 wherein the mating portion of the tilt plate is in the form of a portion extending at an angle from an upper edge of the tilt plate, and wherein the hanger of the device plate extends from an upper edge of the device plate.

17. The mount assembly according to claim 14 further comprising means for securing the device plate to the tilt plate to prevent sliding disengagement of the device plate from the tilt plate, and wherein the tilt plate and the device plate both define at least one securing hole therethrough that align with one another when the device plate is fully seated on the tilt plate and are adapted to receive the securing means therein to prevent sliding disengagement of the device plate from the tilt plate.

18. The mount assembly according to claim 17 wherein the securing means comprises at least one spring-loaded plunger.

19. The mount assembly according to claim 7 further comprising a paddle assembly operatively coupled to the locking cylinder for selectively adjusting the locking cylinder between the unlocked and locked states.

20. The mount assembly according to claim 7 wherein the base comprises a slatwall mount for mounting the mount assembly onto a slatwall structure.

21. The mount assembly according to claim 7 wherein the linkage member can be selectively locked in position anywhere within an operation range of the linkage member.

22. A mount assembly for adjustably mounting a device on a structure, the mount assembly comprising:
 a base coupleable to the structure;
 a tilt plate coupleable to the device, the tilt plate pivotally connected to the base; and
 a position locking mechanism comprising:
 a linkage member extending between the base and the tilt plate, the linkage member connected to the tilt plate such that the linkage member moves relative the base as the tilt plate is pivoted about the base;
 a lock coupled to the base and cooperating with the linkage member, the lock selectively adjustable between an unlocked state in which the linkage member is free to move relative the base thereby allowing the tilt plate to pivot about the base, and a locked state in which the linkage member is retained in position by the lock relative the base thereby preventing the tilt plate from pivoting about the base; and
 a counterbalance mechanism for counterbalancing at least part of the weight of the device when the device is coupled to the tilt plate, the counterbalance mechanism extending between and connected to the base and the tilt plate, the counterbalance mechanism being connected to a side of the tilt plate and to a corresponding side of the base.

23. The mount assembly according to claim 22 wherein the counterbalance mechanism is a spring.

24. A mount assembly for adjustably mounting a device on a structure, the mount assembly comprising:
 a base coupleable to the structure;
 a tilt plate coupleable to the device, the tilt plate pivotally connected to the base;
 a position locking mechanism comprising:
 a linkage member extending between the base and the tilt plate, the linkage member connected to the tilt plate such that the linkage member moves relative the base as the tilt plate is pivoted about the base; and
 a lock coupled to the base and cooperating with the linkage member, the lock selectively adjustable between an unlocked state in which the linkage member is free to move relative the base thereby allowing the tilt plate to pivot about the base, and a locked state in which the linkage member is retained in position by the lock relative the base thereby preventing the tilt plate from pivoting about the base; and
 a device plate being slidably connectable with the tilt plate by sliding the device plate onto the tilt plate, the device plate comprising a front side and a back side, the device being fastenable to the front side, the device plate further comprising a hanger, and a hook protruding from the back side and being spaced away from the hanger, wherein when the device plate is slid onto the tilt plate, the hanger engages the mating portion of the tilt plate to retain the device plate in position on the tilt plate and to transfer weight of the device to the tilt plate, and the hook engages the hook engagement portion on the tilt plate to further retain the device plate in position on the tilt plate, and wherein the hook engagement portion is in the form of a slot defined in the tilt plate, the slot extending in a direction that is substantially parallel to the axis along which the device plate is slid onto and off of the tilt plate, and wherein the hook of the device plate is positioned correspondingly with the slot in the tilt plate so that the hook is receivable into the slot, and wherein when the device plate is fully slid onto the tilt plate, the hook retains the device plate in position on the tilt plate by engaging the slot.

25. A mount assembly for adjustably mounting a device on a structure, the mount assembly comprising:
 a base coupleable to the structure;
 a tilt plate coupleable to the device, the tilt plate pivotally connected to the base;
 a position locking mechanism comprising:
 a linkage member extending between the base and the tilt plate, the linkage member connected to the tilt plate such that the linkage member moves relative the base as the tilt plate is pivoted about the base; and
 a lock coupled to the base and cooperating with the linkage member, the lock selectively adjustable between an unlocked state in which the linkage member is free to move relative the base thereby allowing the tilt plate to pivot about the base, and a locked state in which the linkage member is retained in position by the lock relative the base thereby preventing the tilt plate from pivoting about the base; and
 a device plate being slidably connectable with the tilt plate by sliding the device plate onto the tilt plate, the device plate comprising a front side and a back side, the device being fastenable to the front side, the device plate further comprising a hanger, and a hook protruding from the back side and being spaced away from the hanger, wherein when the device plate is slid onto the tilt plate, the hanger engages the mating portion of the tilt plate to retain the device plate in position on the tilt plate and to transfer weight of the device to the tilt plate, and the hook engages the hook engagement portion on the tilt plate to further retain the device plate in position on the tilt plate, and wherein the mating portion of the tilt plate is in the form of a portion extending at an angle from an upper edge of the tilt plate, and wherein the hanger of the device plate extends from an upper edge of the device plate.

* * * * *